Nov. 13, 1923.  
C. A. CHARBENEAU  
1,473,902  
EXPOSURE IDENTIFICATION ATTACHMENT FOR CAMERAS  
Filed April 28, 1922    2 Sheets-Sheet 1
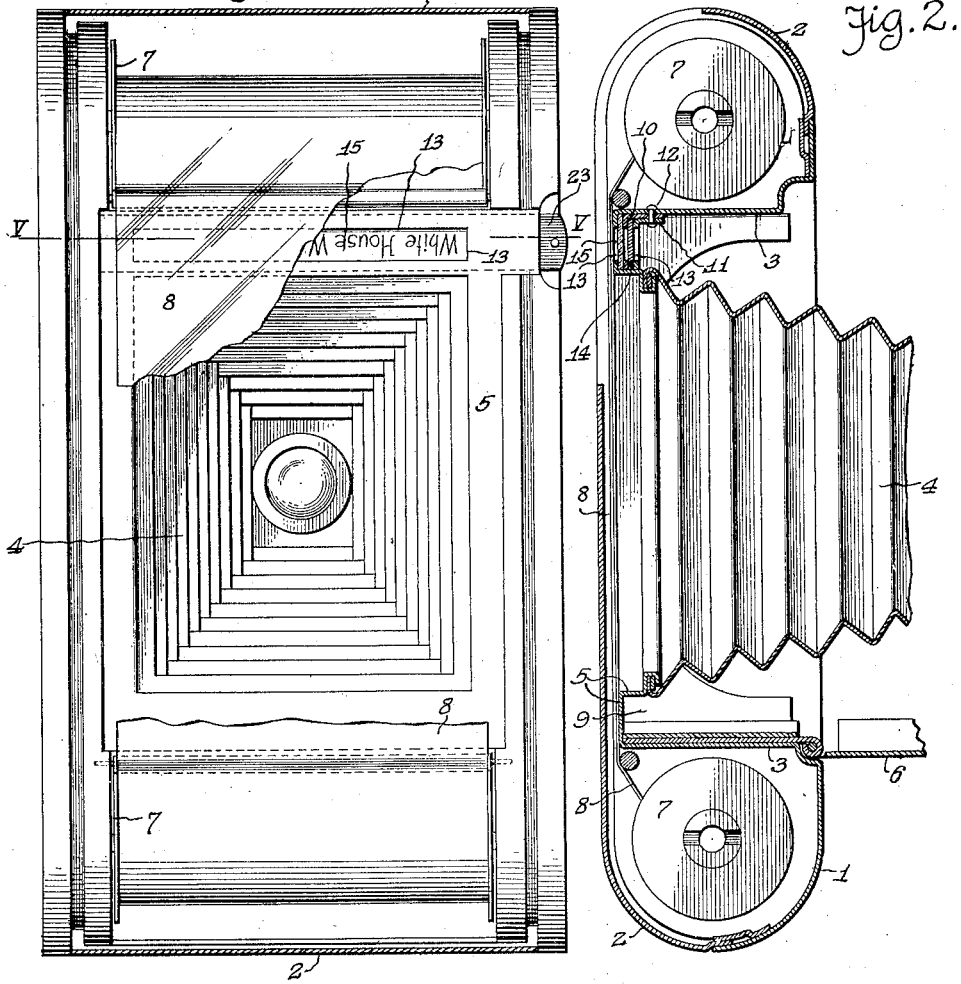
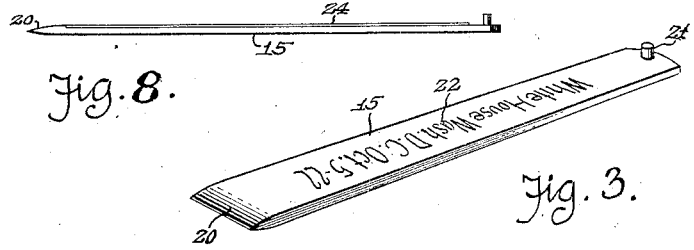
Inventor  
Clarence A. Charbeneau,
By
Attorneys Nov. 13, 1923.  
C. A. CHARBENEAU  
1,473,902  
EXPOSURE IDENTIFICATION ATTACHMENT FOR CAMERAS  
Filed April 28, 1922    2 Sheets-Sheet 2
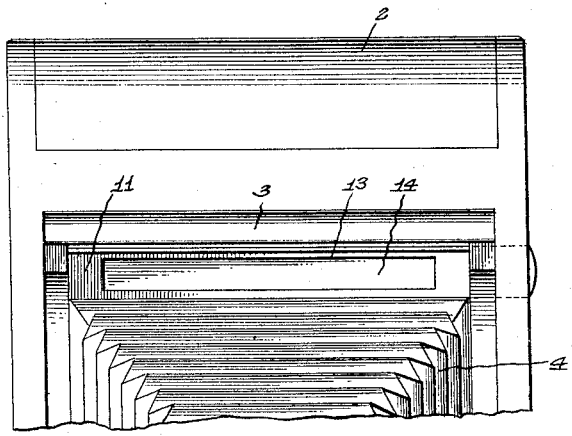
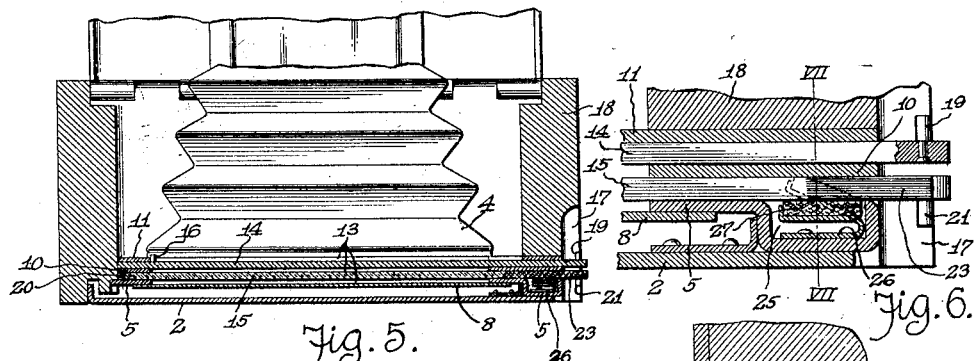
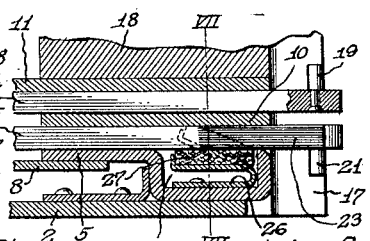
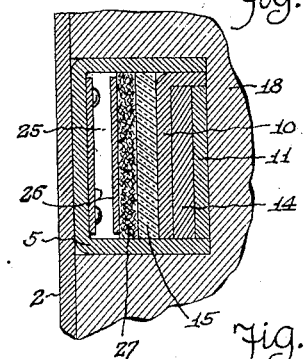
Inventor  
Clarence A. Charbeneau,
Attorneys Patented Nov. 13, 1923.

1,473,902

UNITED STATES PATENT OFFICE.

CLARENCE A. CHARBENEAU, OF MOUNT CLEMENS, MICHIGAN.

EXPOSURE-IDENTIFICATION ATTACHMENT FOR CAMERAS.

Application filed April 28, 1922. Serial No. 557,135.

*To all whom it may concern:*

Be it known that I, CLARENCE A. CHARBENEAU, a citizen of the United States of America, residing at Mount Clemens, in the county of Macomb and State of Michigan, have invented certain new and useful Improvements in Exposure-Identification Attachments for Cameras, of which the following is a specification, reference being had therein to the accompanying drawings.

This invention relates to an exposure identification attachment for cameras and has special reference to an autograph feature that may be embodied in a conventional form of camera to permit of the user causing a film or other sensitive member to be marked with indicia relating to the subject, etc., on the film. For instance, after each exposure of the film the operator of the camera may make a memorandum regarding the exposure and cause the memorandum to be reproduced on the film, either before or after exposure, preferably simultaneously with the exposure so that the operator will not forget the subject of the picture when developed.

My invention aims to provide an attachment of the above character that may be embodied in a camera to permit of a film being marked without any danger of the film being befogged or injured and in one form of my invention this result is obtained by operating a reciprocable shutter, when the camera is open and in another form by operating a pivoted shutter. In either instance a positive is made independent of the camera and consequently an operator can use greater care in making a positive than if the same were made in the camera. After making the positive it is placed in the camera and exposed to the light, to cause the indicia on the positive to be transferred to the sensitive film of the camera, producing a negative on the film that is in proximity to the picture to be eventually made from the film. The use of the autograph positive may be before a picture is "snapped" or afterwards, and the nature of the positive is such that it may be repeatedly used and form a part of the camera so as to be always convenient to an operator equipped with a pencil or other marking instrumentality by which the positive may be provided with suitable indicia.

My invention further aims to provide an autograph attachment which will not interfere with the usual film supporting and adjusting mechanism nor the bellows of the camera and provision is made to positively exclude light from an unexposed film during manipulation of the autographic device. The construction entering into my invention will be hereinafter specifically described by aid of the drawings, wherein—

Figure 1 is a rear elevation of a conventional form of film camera, partly in section with the film partly broken away showing a positive in position for causing the film to be marked or identified;

Fig. 2 is a vertical longitudinal sectional view of the camera;

Fig. 3 is a perspective view of a positive member adapted to form part of the camera;

Fig. 4 is a front elevation of a portion of the camera;

Fig. 5 is a horizontal sectional view taken on the line V—V of Fig. 1;

Fig. 6 is an enlarged longitudinal sectional view of a portion of the camera showing an automatic closure or light excluding member;

Fig. 7 is a cross sectional view taken on the line VII—VII of Fig. 6, and

Fig. 8 is an edge view of a modified form of positive member that may be used in connection with the camera.

In the drawings, I show a conventional form of camera comprising an oblong casing 1, a detachable lid or cover 2, a bellows housing 3 for a bellows 4, a bellows frame 5 at the rear end of the housing 3 and to which frame the bellows 4 is connected, a drop door 6 adapted to support the outer end of the bellows, a lens and other instrumentalities of a camera, and spools 7 in the ends of the casing 1 supporting a film 8 across the frame 5 so that said film may be exposed to light admitted by the bellows 4. The above are a few of the essential parts of the camera and my attachment is located in the bellows housing 3 and the frame 5, at one end of the camera casing. By reference to Fig. 2 it will be noted that the frame 5 cooperates with the housing 3 in providing transverse channel ways 9 and in one of these ways I mount angle frames 10 and 11 having flanges thereof connected to the housing 3 by rivets 12 or other fastening means. The angle frames 10 and 11 and the bellows frame 5 have oblong openings 13, said openings being in matched registration or alinement to permit of light passing therethrough on to the sensitized film 8 against the bellows frame 5. The angle frames 10 and 11 cooperate with each other and with the bellows frame 5 in providing transverse slide ways, one for a reciprocable shutter 14 and the other for a detachable positive member 15.

The shutter 14 is opaque and made of a suitable light excluding material. At the inner end of the shutter is a stop pin 16 extending into the opening 13 of the angle frame 11 and said stop pin is adapted to engage an end wall of the opening 13 and limit the outward movement of the shutter, thus preventing the shutter from becoming accidentally displaced relative to the camera. The outer end of the shutter terminates at a recess 17 in an end wall 18 of the camera and the outer end of said shutter has a pin or finger piece 19 which will permit of the shutter being easily gripped and pulled outwardly to permit of light being cast on the positive member 15.

The positive member 15 may be made of a transparent or translucent material, for instance celluloid and said positive member is in the form of an oblong strip having its inner end beveled as at 20, and its outer end provided with a pin or finger piece 21. The beveled end of the positive member permits of its easy insertion in the slideway between the bellows frame 5 and the angle frame 10 and it can be readily withdrawn by gripping the pin 21, this pin as well as the pin 19 of the shutter being within the recess 17 of the camera wall 18. If celluloid is used as a material for the positive member 15, I prefer to roughen the face of said member so that it may be easily provided with indicia 22 placed thereon by a pencil or other marking instrumentality which will render portions of the transparent positive member opaque so that when the positive member is exposed to the sensitized film 8 the indicia 22 will be reproduced on the film. By selecting a proper material the transparency of the positive member may be regulated to prevent the film from being befogged during the exposure of the positive, and to prevent light from passing endwise through the positive member the outer end of said member may be rendered more or less opaque, for instance as indicated at 23.

Instead of using celluloid or a translucent material for the positive member 15, I may use a fully transparent material and mount on one side of the positive member a detachable inscription member 24 that may be in the form of a semi-transparent strip of paper on which the indicia is written or otherwise marked. The operator of the camera may be equipped with a quantity of the inscription members that may be applied to the positive member by the inscription members being gummed to adhere to said positive member. As a matter of fact, there are various ways of providing a positive member that may be used in the camera, and as set forth in the beginning the positive member may be exposed before or after exposing the film 8.

Since the positive member 15 must be removed from the camera to be provided with indicia, there is a possibility of light entering the slide-way which receives the positive member and to exclude such light, while the positive member is removed, I provide a closure at that side of the bellows frame 5 adjacent the recess 17. The bellows frame 5 is off-set or shaped to afford a pocket 25 for a resilient member 26 which has one end thereof fixed in the pocket 25 and the opposite end thereof provided with a yieldable closure 27, made of felt, rubber or other light excluding material that may bear against the positive member 15 when the same is in the camera, as shown in Fig. 6, and against the angle frame 10 when the positive member is removed. This is brought out by dotted lines in Fig. 6 and it is apparent that the open end of the slideway will be closed and thus prevent light from befogging the film 8.

It is thought that the manner of using the camera in accordance with my invention will be apparent without further description and while in the drawings there are illustrated the preferred embodiments of my invention, it is to be understood that the structural elements are susceptible to such variations and modifications as fall within the scope of the appended claims.

What I claim is:—

1. In a camera, a bellows frame having a small opening for the exposure of a film for autographic purposes, a positive member slidable in the opening of said bellows frame, and a shutter in the same bellows frame opening adjacent said detachable positive member and by which the positive member may be exposed, said shutter being slidable by lateral movement relative to the side of the camera.

2. A camera as called for in claim 1, wherein the shutter is reciprocable in parallelism with the detachable positive member and said shutter constructed to at all times remain in engagement with the camera.

3. An autographic camera including a bellows frame having a small opening adapted for exposing a portion of a film against said frame, angle frames in said bellows frame, a shutter slidable between said angle frames, means carried by said shutter co-operating with one of said angle frames to limit an opening movement of said shutter, and a positive member adapted to be placed in the bellows frame for reproducing indicia on the film, when light is admitted by opening said shutter.

4. An autographic camera including a bellows frame having a small opening adapted to expose a film to light, angle frames in said bellows frame, a shutter slidable between said angle frames, and a positive member adapted to be placed between said bellows frame and one of said angle frames, and exposed to light by movement of said shutter.

5. A camera as called for in claim 4, wherein the positive member is in the form of a transparent strip on which may be placed indicia to be reproduced on a film in the camera.

In testimony whereof I affix my signature in presence of two witnesses.

CLARENCE A. CHARBENEAU.

Witnesses:
KARL H. BUTLER,
G. E. McGRANN.